Feb. 21, 1961 J. W. LAMBERT 2,972,254
WELL FLOW PERIODIC SAMPLING MECHANISM
Filed July 18, 1957 2 Sheets-Sheet 1

INVENTOR
JOHN W. LAMBERT
BY *Oberlin & Limbach*
ATTORNEYS

Feb. 21, 1961 J. W. LAMBERT 2,972,254
WELL FLOW PERIODIC SAMPLING MECHANISM
Filed July 18, 1957 2 Sheets-Sheet 2

INVENTOR.
JOHN W. LAMBERT
BY
Oberlin & Limbach
ATTORNEY

United States Patent Office 2,972,254
Patented Feb. 21, 1961

2,972,254
WELL FLOW PERIODIC SAMPLING MECHANISM

John W. Lambert, Borger, Tex., assignor to Lambert Engineering Co., Inc., Borger, Tex.

Filed July 18, 1957, Ser. No. 672,659

7 Claims. (Cl. 73—422)

The present invention relates generally as indicated to a well testing apparatus and, more particularly, to an apparatus adapted for use in combination with a pumping unit employed in oil well operations.

It is one principal object of this invention to provide a well testing apparatus which is connected in the flow line from the well and which is intermittently operative to divert the flow of fluid in the flow line to a separate tank or the like, for analysis as to volume, specific gravity, or composition, as desired.

It is another object of this invention to provide a well testing apparatus which is operated by the well pump unit during one or more cycles of operation of the latter at predetermined intervals whereby the daily production of the well may be readily logged from the weights and/or volumes of the samples thus taken at regular intervals.

It is another object of this invention to provide a well testing apparatus which essentially comprises a three-way valve which, in its normal operating position, allows the flow of fluid pumped from the well to flow therethrough from an inlet to the normal production outlet thereof, and which in another position closes off the communication between the inlet and the normal production outlet and opens communication between the inlet and a sample production outlet of the valve, said valve being thus operated at regular intervals by the walking beam of the well pump unit.

It is still another object of this invention to provide a well testing apparatus which is simple and economical in structure and which is foolproof in operation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the varous ways in which the principle of the invention may be employed.

Figure 1:
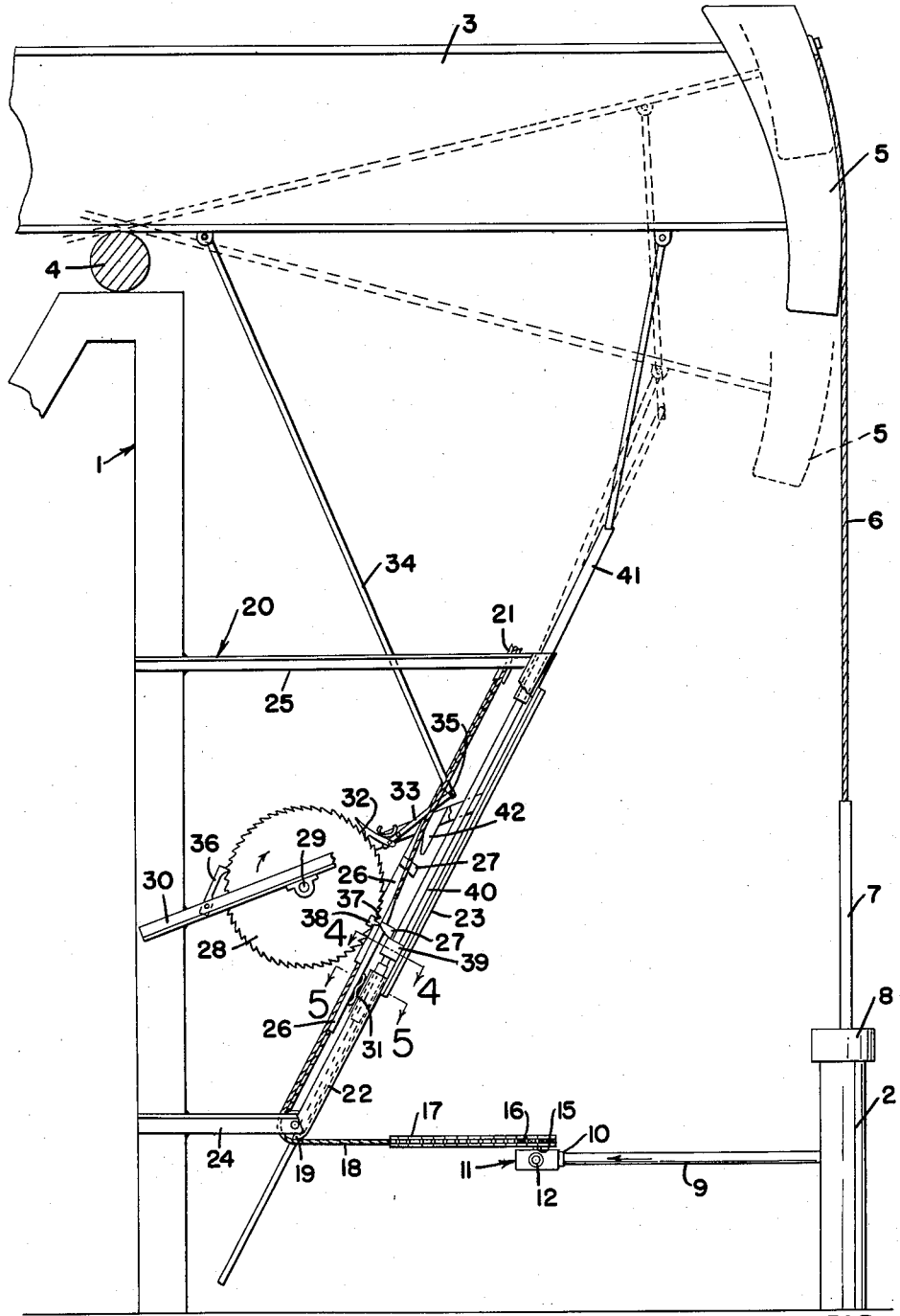
Fig. 1 is a side elevation view of a preferred embodiment of this invention showing the well testing apparatus in operative relation with reference to the well pump.
Figure 2:
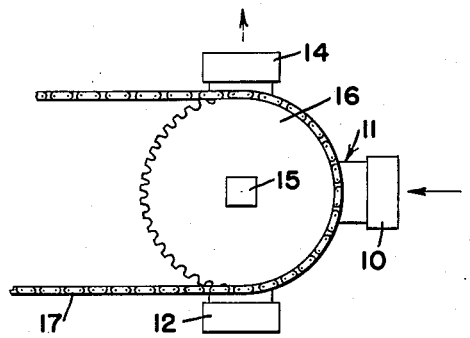
Fig. 2 is a top plan view of the three-way valve that has its inlet connected to the flow line from the well casing and that has two outlets, namely, a normal production outlet and a sample production outlet, said Fig. 2 showing the sprocket wheel and chain by which the valve is operated to alternately communicate the inlet with the normal production outlet and the sample production outlet.
Figure 3:
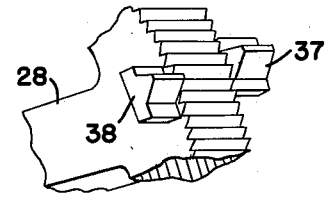
Fig. 3 is a fragmentary perspective view showing the pump-operated ratchet wheel which has peripherally offset dogs mounted thereon which couple the valve actuators to a reciprocatory element of the well pump for actuating the three-way valve as aforesaid.
Figure 4:
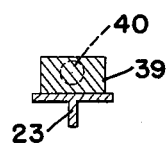
Fig. 4 is a transverse cross-section (on enlarged scale) taken substantially along the line 4—4, Fig. 1.
Figure 5:
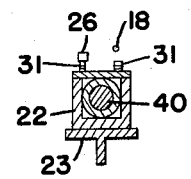
Fig. 5 is a transverse cross-section view (on enlarged scale) taken substantially along the line 5—5, Fig. 1.

Referring now in detail to the drawings and first, especially to Fig. 1, the reference numeral 1 denotes a bearing stand which is disposed adjacent the top of the well casing 2 and to which the rocking beam 3 of the well pump is journalled as at 4.

The rocking beam 3 is provided with the usual horse's head 5 to which a cable 6, or the like, is secured for vertically reciprocating the so-called "polish" rod 7 which extends into the casing 2 through the stuffing box 8.

The side of the well casing 2 is provided with a flow line 9 through which the fluid pumped from the well flows in the direction indicated by the arrow.

The flow line 9 terminates at the inlet 10 of a conventional three-way valve 11 which may be of the rotary plug type having an angle drilling in the rotary plug (not shown) to alternately communicate the inlet 10 with the normal production outlet 12 and with the sample production outlet 14 responsive to rotation of the plug 90° in opposite directions.

The stem 15 of the valve plug has nonrotatably secured thereto a sprocket wheel 16 over which is trained or looped a sprocket chain 17, the ends of the chain having secured thereto the ends of a flexible cable 18 which passes over a pair of pulleys 19, 19 mounted one behind the other on the well tester frame 20. The cable 18 is looped over a pulley 21 also mounted on the frame 20, the portions of the cable 18 between pulleys 19, 19 and pulley 21 being parallel to each other and generally parallel to the channel 22 and T-bar brace 23 that extend obliquely upward across the free ends of the bottom and top frame members 24 and 25. However, if desired the sliding rod may move straight up and down and the various cables next to it lie in a vertical plane.

Between the pulleys 19, 19 and the pulley 21 each stretch of the cable 18 has mounted thereon a cable rod 26 provided with a laterally projecting catch 27. Each cable rod 26 is yieldably pressed laterally toward the ratchet wheel 28 which is journalled at 29 on the frame member 30, as by means of a leaf spring 31 or the like.

The ratchet wheel 28 is advanced one tooth at a time in either direction (being shown arranged for such movement in a clockwise direction as viewed in Fig. 1) during each upstroke of the walking, or rocking, beam 3 through the pawl 32 which is actuated by the linkage 33—34 of which the link 33 is pivotally mounted on the frame member 30 and of which the other link 34 is pivotally mounted on the beam 3 adjacent the bearing 4, said links 33 and 34 being pivoted together at 35. A holding pawl 36 is provided to hold the ratchet wheel at its advanced position while the advancing pawl is moved in a counter-clockwise direction to engage the next tooth during the downstroke of the beam 3.

Mounted on opposite sides of the ratchet wheel are dogs 37 and 38 which are preferably offset one tooth, the dog 37 being adapted to actuate one cable rod 26 (the rear one as viewed in Fig. 1) and the other dog 38 being adapted to actuate the other cable rod 26 (the front one as viewed in Fig. 1).

When the ratchet wheel 28 reaches the position shown in Fig. 1, which it will do once each revolution, the front cable rod 26 will be laterally shifted by dog 38 to move the catch 27 thereof into the path of the traveling collar 39 mounted on the sliding rod 40 which is slidably mounted in the frame member 22—23, the sliding rod 40 being linked to the rocking beam 3, as shown, through the angular link 41 pivotally connected at its upper end to said beam 3. Thus, as the traveling collar 39 moves up while the catch 27 is engaged therewith, the front cable rod 26 and the cable 18 and the chain 17 will be moved correspondingly so as to effect rotation of sprocket wheel 16 that is connected to the valve stem 15. Upon 90° rotation of the valve plug in valve 11, the tapered end of the front cable rod 26 will engage the trip 42 which will disengage the catch 27 from the traveling collar 39 whereupon the rocking beam 3 is released from the valve 11 to continue the rest of its upward stroke.

Now, when the rocking beam 3 moves downward and the ratchet wheel 28 has been advanced another tooth, the other dog 37 will engage the rear cable rod 26 to place its catch 27 for engagement by the traveling collar 39, whereupon the valve 11 will be actuated back to its normal flow position as the traveling collar 39 and sliding rod 40 move upwardly. The tapered end of the rear cable rod 25 then engages the trip cam 42 to release its catch 27 from the traveling collar 39. This restores the valve 11 to its normal position wherein the pumped fluid in line 9 flows therethrough from the inlet 10 to the normal production outlet 12. Accordingly, the well pumping operation will continue in its usual manner until the ratchet wheel 28 has been indexed to bring its dog 38 into engagement with the front cable rod 26.

As an example, assuming that the rocking beam 3 is being actuated at the rate of sixteen strokes per minute and that it is desired to take a well sample every ten minutes, all that it is necessary to do is to provide a ratchet wheel 28 having 160 teeth. In the present case the pumping stroke may be about 30 inches, for example, whereas, the valve 11 is shifted from one position to the other responsive to a 5 inch movement of the cable 18 whereby the trip 42 has been provided for the purpose of obtaining prompt actuation of the valve during a minor portion of the operating stroke of the pump so as to get a sample which represents the well production during one stroke which, in the present case, is once in each ten minute interval. Thus it will be seen that the traveling collar 39 reciprocated by the rocking beam actuates the valve through a lost motion connection with the valve member, the remaining stroke of the collar, about 25 inches, being lost as to movement of the valve member.

By measurements taken on the total sample obtained during the period of test, it is an easy matter to determine the daily production of the well with reference to volume, specific gravity, and other properties. Also each specimen may be tested, automatically if desired, as withdrawn. In the example cited, a ratchet having 160 teeth is used; accordingly the production over a test period of, say, 24 hours will be 160 times the amount measured in the sample container.

Figure 6:
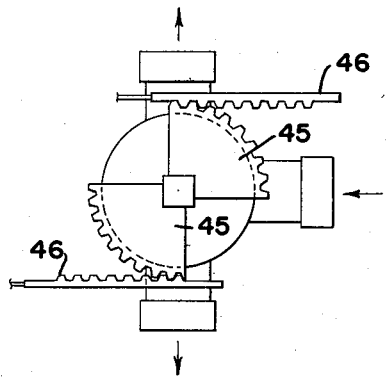
Fig. 6 is a top plan view showing another way of operating the three-way control valve utilizing gear segments and racks instead of a sprocket wheel and chain as in Fig. 2; and, Fig. 7 is a fragmentary elevation view showing a modified form of ratchet gearing arrangement which may be substituted for the single ratchet wheel shown in Fig. 1.

Instead of employing a sprocket wheel 16 and chain 17 for actuating the valve 11, gear segments 45 and gear racks 46 in mesh therewith may be employed as shown in Fig. 6.

Figure 7:
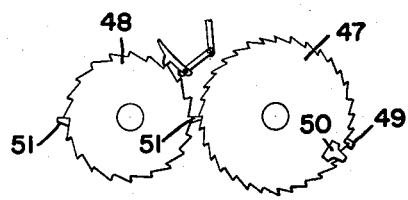

As another modification, instead of the single ratchet wheel 28 it is proposed to provide, as shown in Fig. 7, a pair of ratchet wheels 47 and 48 one of which (ratchet wheel 47) is equipped with the circumferentially offset dogs 49 and 50 and the other of which (ratchet wheel 48) is provided with a desired number of projecting teeth 51 that only periodically advance the ratchet wheel 47 one tooth at a time. Herein two such teeth 51 are provided whereby only twice during each revolution of the ratchet wheel 48 is the other ratchet wheel 47 advanced one tooth. This arrangement makes for simplicity and ease of adjustment of the intervals for the taking of specimens from the sample production outlet 14 of the valve 11. Likewise, the respective ratchet wheels 47 and 48 can be much smaller in diameter and have fewer than the 160 teeth provided on ratchet wheel 28. For example, if, with one projecting tooth 51 on the small ratchet wheel 48 a sample is taken every ten minutes, then by installing another diametrically opposite projecting tooth 51, a specimen may be taken every five minutes and, similarly, if three projecting teeth 51 are provided at equally spaced intervals, a specimen will be taken every three and one-third minutes, etc.

In any event, regardless of specific details of construction, the present invention in its broader aspects contemplates the provision of a simple and efficient well tester by which normal flow of the pumped fluid is diverted to a sample production outlet of a valve at regular intervals, the valve being actuated by the well pump in such manner that the daily production of the well may be readily logged.

Other modes of applying the principle of the invention may be employed, change being made as regards the details described, provided the features stated in any of the following claims, or the equivalent of such, be employed.

I therefore particularly point out and distinctly claim as my invention:

1. In combination, a reciprocating well pump; a valve formed with an inlet communicated with the pump outlet, and with a production outlet and a sample outlet with which the inlet is selectively communicated by a movable valve member in said valve; valve operating means reciprocated by said pump and operatively connected to said valve member to move the latter periodically during successive strokes of said pump, in one direction for taking of a fluid specimen from said sample outlet constituting the entire production flow during such successive strokes and in the other direction for restoration of normal production flow solely through said production outlet.

2. The combination with a well pump of the type including a rocking beam, a horse's head at the end of said beam, and a polish rod connected to said horse's head for vertical reciprocation in the well casing, of a valve through which the fluid pumped from the well flows, said valve being provided with production and sample outlets and with a valve member movable in said valve to divert flow of fluid to said sample outlet; a valve actuator operated by said beam and having a lost-motion connection with said valve member; and catch means periodically operated by said beam to engage said actuator with said valve member for movement of the latter to so divert fluid flow solely to said sample outlet, and further catch means operated by said beam subsequently periodically to engage said actuator with said valve member for movement of the latter to redivert fluid flow solely to said production outlet.

3. The combination with a well pump of the type including a rocking beam, a horse's head at the end of said beam, and a polish rod connected to said horse's head for vertical reciprocation in the well casing, of a valve through which the fluid pumped from the well flows, said valve being provided with a sample outlet and with a valve member movable in said valve to divert flow of fluid to said sample outlet; a valve actuator operated by said beam and having a lost-motion connection with said valve member; catch means periodically operated by said beam to engage said actuator with said valve member during successive strokes of said beam in one direction for movement of the latter to so divert fluid flow to said sample outlet and to restore normal production flow through said valve, said catch means including a ratchet wheel advanced stepwise by the rocking motion of said beam, and catch-actuating dogs on said ratchet wheel effective, upon predetermined advancement of the latter, to so engage said valve member with said valve actuator; and trip means operative to move said catch means to disengage said valve member from said valve actuator for continued movement of the latter after the valve member has been moved as aforesaid.

4. A well testing apparatus comprising a three-way valve provided with an inlet adapted for connection with a well flow line and with normal production and sample production outlets; a valve member rotatable in said valve to selectively communicate said inlet with either of said outlets; valve actuating means including a reciprocable member interconnected with said valve member to rotate the latter responsive to lineal movement of said reciprocable member; reciprocating means adapted to be periodically engaged with said reciprocable member; and means for periodically engaging said reciprocable member with said reciprocating means, said reciprocable member being mounted to be laterally shifted and being provided with a laterally projecting catch, said last-named means being operative to periodically laterally shift said reciprocable member to place said catch in the path of reciprocation of said reciprocating means.

5. The well testing apparatus of claim 4 wherein said last-named means comprises a ratchet wheel provided with a radially projecting dog that periodically effects lateral shifting of said reciprocable member as said wheel is indexed.

6. The well testing apparatus of claim 5 wherein another laterally shiftable, and catch equipped reciprocable member is provided to restore said valve member to a position communicating said inlet with said normal production outlet, and wherein said ratchet wheel is provided with a second projecting dog circumferentially offset with respect to the first-mentioned dog and adapted to laterally shift said another reciprocable member with said reciprocating means during a succeeding stroke of the latter.

7. The well testing apparatus of claim 6 wherein said reciprocable members are mounted on side by side portions of an endless flexible member one end of which is looped over a drive wheel secured on said valve member.

References Cited in the file of this patent

UNITED STATES PATENTS

| | | |
|---|---|---|
| 1,562,121 | Newton | Nov. 17, 1925 |
| 1,852,445 | Calkins et al. | Apr. 5, 1932 |
| 2,140,920 | Myracle | Dec. 20, 1938 |
| 2,161,507 | Egersdorfer | June 6, 1939 |
| 2,576,737 | Wendel | Nov. 27, 1951 |